United States Patent
Suzuki et al.

[11] Patent Number: 5,476,539
[45] Date of Patent: Dec. 19, 1995

[54] GAS PURIFYING APPARATUS

[76] Inventors: Nagatoshi Suzuki, No. 5-7-7 Kugahara, Ota-ku, Tokyo; Manabu Higashi, No. 9-5-9, Kamisoyagi, Yamato-shi, Kanagawa-Prefecture; Kanichi Fujii, No. 2-22-21, Namekawa-cho, Hidachi-shi, Ibaraki-prefecture, all of Japan

[21] Appl. No.: 220,030

[22] Filed: Mar. 30, 1994

[30] Foreign Application Priority Data

Jul. 12, 1993 [JP] Japan ................. 5-043136 U

[51] Int. Cl.⁶ ........................................ B03C 3/78
[52] U.S. Cl. ........................ 96/44; 55/242; 96/47; 96/97; 96/99
[58] Field of Search ...................... 96/97, 99, 44, 96/47, 45, 50; 55/242

[56] References Cited

U.S. PATENT DOCUMENTS

| | | | |
|---|---|---|---|
| 1,339,480 | 5/1920 | Schmidt | 96/45 X |
| 2,240,495 | 5/1941 | Dillon et al. | 96/97 X |
| 4,247,307 | 1/1981 | Chang | 96/45 X |
| 4,326,862 | 4/1982 | Suzuki | 96/18 |
| 4,345,572 | 8/1982 | Suzuki et al. | 123/568 |
| 4,375,364 | 3/1983 | Van Hoesen et al. | 96/97 X |
| 4,587,807 | 5/1986 | Suzuki | 60/274 |
| 5,041,145 | 8/1991 | Kakinuma et al. | 96/52 |
| 5,061,462 | 10/1991 | Suzuki | 422/186.04 |
| 5,066,316 | 11/1991 | Ikeda | 96/52 |
| 5,084,078 | 1/1992 | Suzuki et al. | 96/52 |
| 5,248,324 | 9/1993 | Hara | 96/97 X |

FOREIGN PATENT DOCUMENTS

| 2018447 | 11/1971 | Germany | 96/97 |
|---|---|---|---|
| 780892 | 11/1980 | U.S.S.R. | 96/97 |

Primary Examiner—Richard L. Chiesa
Attorney, Agent, or Firm—Ronald P. Kananen

[57] ABSTRACT

A low-profile gas purifying apparatus includes a plurality of conductive plates each having a serrated portion at the periphery thereof. The plates are disposed opposite a flat electrode which is coated with a dielectric layer and are separated from the flat electrode by a predetermined gap. A high voltage A.C. power source is connected between the plates and the flat electrode. The plane surfaces of the conductive plates are slanted with respect to the gas flow direction to reduce flow resistance through the apparatus.

4 Claims, 2 Drawing Sheets

GAS PURIFYING APPARATUS

BACKGROUND OF THE INVENTION

1. Field of the Invention

The present invention relates to an improvement of a a purifying apparatus for purifying impure gas such as the exhaust gas emitted by the engines of vehicles, vessels, and generators, and the poisonous gas generated from industrial waste, by using a streamer corona discharge to obtain a clean gas.

2. Description of the Prior Art

Exhaust gas emitted by the engines of vehicles, vessels and generators, and the poisonous gas generated from industrial waste have caused serious problems to the environment and threaten the future earth environment. Accordingly, the purification of such poisonous gas is necessary as soon as possible to prevent further damage.

Recently, a research effort has been conducted to solve environment contamination. To this end, there has been proposed a technique whereby a streamer corona discharge can be stably generated as shown in Japanese Patent Publication Laid-Open No. 63-183211. Moreover, it has been confirmed that the streamer corona discharge is very effective for purifying impure gas.

However, with the conventional gas purifying apparatus as mentioned above it is difficult to achieve a low profile construction which can be installed in a limited space such as under the floor of a vehicle or building.

SUMMARY OF THE INVENTION

The present invention is directed solving the above-mentioned difficulties, and the object of the present invention is to provide a gas purifying apparatus which has a low profile and which is capable of reducing the flow resistance of gas flow in the apparatus and eliminating poisonous material and fine particles within the gas.

In order to achieve the above-mentioned while effectively other objectives of the present invention, the present invention presents a gas purifying apparatus comprising a first electrode composed of at least one conductive plate having a serrated portion at the periphery thereof, a second electrode coated with a dielectric layer at the surface thereof, and a high voltage electric power source connected between both electrodes, wherein the serrated portion of the first electrode and the second electrode are oppositely disposed with a predetermined gap therebetween, and a plane surface of the first electrode is slanted towards the gas flow.

According to another aspect of the invention, the serrated portion of the first electrode and the second electrode are disposed opposite to each other and are formed in an approximately circular arcuate form. There is further provided a cleaning liquid supplying portion for cleaning attachments on at least the first electrode. The cleaning liquid supplying portion is mounted on a reaction container receiving the first electrode and the second electrode.

The present invention has the following additional features.

With the present invention of a gas purifying apparatus, as disclosed, comprising a first electrode composed of at least one conductive plate having a serrated portion at the periphery thereof, a second electrode coated with a dielectric layer at the surface thereof, and a high voltage electric power source connected between both electrodes, wherein the serrated portion of the first electrode and the second electrode are disposed opposite one another with a predetermined gap therebetween, and a plane surface of the first electrode is slanted relative to the gas flow, it is possible to make, for example, a reaction container having a thin size and further to reduce the flow resistance within the flow path through the gas purifying apparatus.

According to another embodiment of the present invention in which the serrated portion of the first electrode and the second electrode are disposed opposite to each other and are formed in an approximately circular arcuate form, it is possible to effectively make the cleaning liquid flow after cleaning the first electrode to the lower tank in the reaction container.

According to a further embodiment of the present invention in which there is provided a cleaning liquid supplying portion for cleaning the attachments attached on at least the first electrode, it is possible not only to purify an impure gas but also to eliminate poisonous gas and fine particles attached at the electrodes thereby avoiding a spark discharge due to the poisonous material and fine particles, which results in easy maintenance, a stable generation of the streamer corona discharge for long period, and a dustproof effect.

According to a further embodiment of the present invention in which the cleaning liquid supplying portion is mounted on a reaction container receiving the first electrode and the second electrode, it is possible to circulate the cleaning liquid in the reaction container thereby effectively utilizing the cleaning liquid.

BRIEF DESCRIPTION OF THE DRAWINGS

These and other features, aspects and advantages of the present invention will become better understood with regard to the following description, appended claims, and accompanying drawings wherein:

DESCRIPTION OF THE PREFERRED EMBODIMENTS

Figure 1:
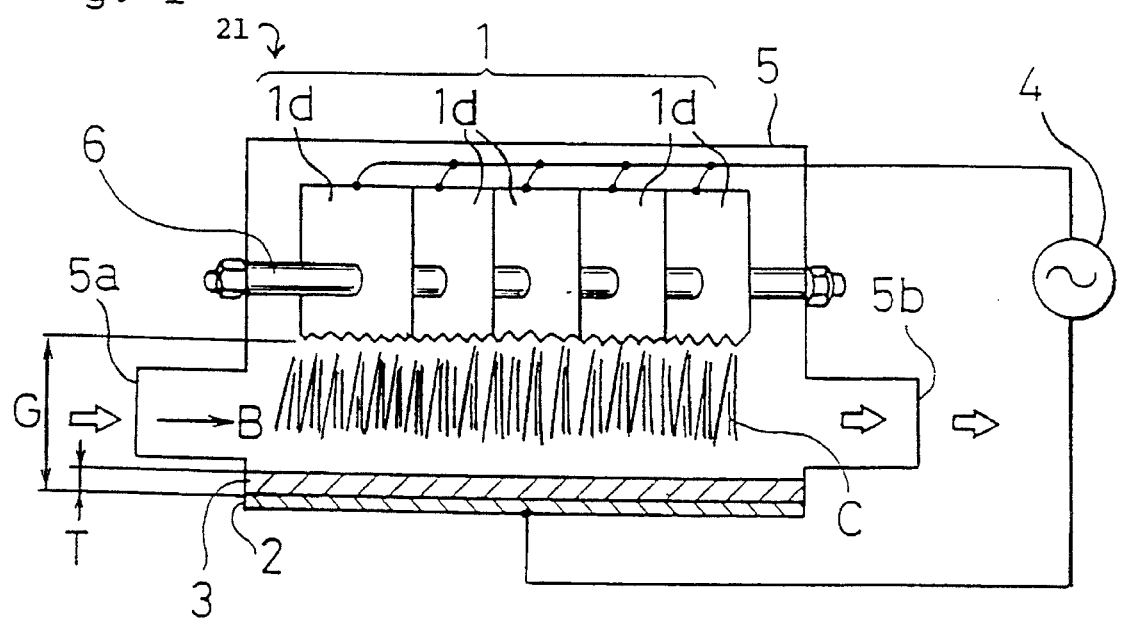
FIG. 1 is a longitudinal sectional view showing a first embodiment of the present invention.
Figure 2:
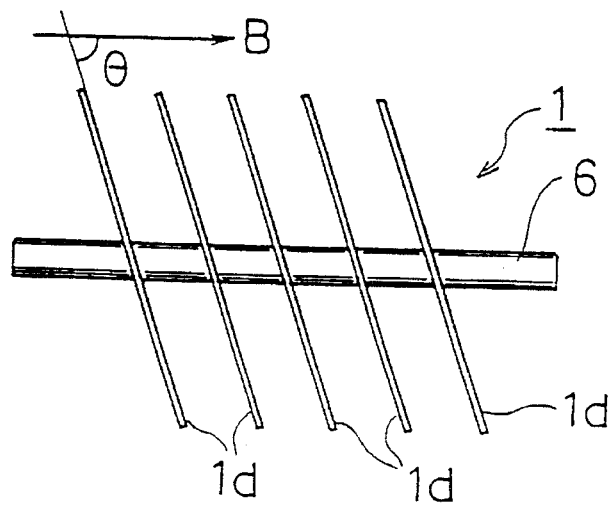
FIG. 2 is a plan view of a first electrode shown in FIG. 1.
Figure 3:
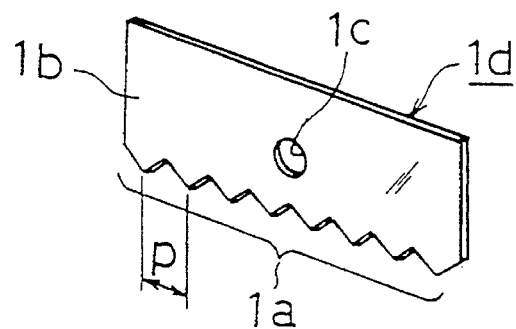
FIG. 3 is a perspective view of a conductive plate of a first electrode of FIG. 2.

The attached FIGS. 1 to 3 show a first embodiment of the present invention. FIG. 1 shows a schematic sectional view of the gas purifying apparatus designated generally by a reference numeral 21. FIG. 2 is a plan view of a first electrode 1 shown in FIG. 1. FIG. 3 is a perspective view of a conductive plate 1d of the first electrode 1 in FIG. 2. In FIGS. 1 to 3, a reference numeral 1 denotes a first electrode; a reference numeral 2 designates a second electrode; a reference numeral 3 designates a dielectric layer; a reference numeral 4 designates a high voltage electric power source; and a reference numeral 5 refers to a reaction chamber or container. The structure of these members will be explained hereinafter.

The first electrode 1 is composed of a plurality of spaced conductive plates 1d which lie generally parallel to each other. Each of the conductive plates 1d is made of a press-molded plate material such as stainless steel, and has a serrated portion 1a at the peripheral portion thereof as shown in FIG. 3. An opening 1c is defined at the center portion of each conductive plate. The first electrode 1 is constructed such that a pole 6 composed of glass or the like is inserted through the opening 1c of each of the conductive plates 1d, and the plane surface 1b of each conductive plate 1d is slanted in the axial direction of the pole 6. The slanted angle θ may be set as θ=75°–80° with respect to the flow direction B of gas as shown by the arrow B in FIG. 2.

The second electrode 2 is coated with a dielectric layer 3 on the surface thereof. The dielectric layer 3 may be a material such as ceramic, organic glass or organic resin, selected in accordance with its usage.

The high voltage electric power source 4 is connected between the first electrode 1 and the second electrode 2. The high voltage electric power source 4 is an electric power source for repeatedly generating a high voltage with positive and negative polarities. In this embodiment, a boosted A.C. electric power source is used.

Moreover, the reaction container 5 is a container having an inlet 5a and an outlet 5b and is mounted with the first electrode 1 at the upper portion thereof and the second electrode 2 at the lower portion thereof respectively as shown in FIG. 1.

In the reaction container 5, the streamer corona discharge C is generated between the serrated portion 1a of each conductive plate 1d of the first electrode 1 and the second electrode 2. A gas flow path is formed within the streamer corona discharge C by disposing the serrated portion 1a of the first electrode 1 and the second electrode 2 opposite each other separated by a predetermined gap G. The axis of the pole 6 for supporting the conductive plates 1d is disposed along the direction B of the gas flow path as shown in FIGS. 1 and 2, whereas the plane surface 1b of the first electrode 1 is slanted with respect to the direction B of the gas flow path thereby reducing flow resistance.

The operation of the first embodiment constructed as mentioned above will be now explained.

The first electrode 1 generates different corona discharges in accordance with the polarity of the voltage generated by the high voltage electric power source 4. For example, when a high A.C. voltage is applied from the high voltage electric power source 4 between the first electrode 1 and the second electrode 2, the state in which the first electrode 1 has a positive polarity and the second electrode 2 has a negative polarity and in turn the state in which the first electrode 1 has a negative polarity and the second electrode 2 has a positive polarity are generated repeatedly.

In the former statue in which the first electrode 1 has a positive polarity, a corona discharge with a positive polarity is generated between the serrated portion 1a of the first electrode 1 and the second electrode 2 coated with the dielectric layer 3, thereby oxidizing and reducing the impure gas molecules including poisonous gas passing through the corona discharge with positive polarity by utilizing plasma due to the corona discharge. A so-called streamer corona discharge is predominantly a corona discharge with positive polarity.

On the other hand, in the latter state in which the first electrode 1 has a negative polarity, a corona discharge with a negative polarity is generated between the serrated portion 1a of the first electrode 1 and the second electrode 2 coated with the dielectric layer 3, thereby ionizing the impure gas including poisonous material passing through the corona discharge with negative polarity and attracting positive ions and negative ions to the first electrode 1 side and the second electrode 2 side respectively. At this time, electrons are also emitted from the first electrode 1 and couple with the positive charge accumulated on the surface of the dielectric layer 3 thereby reducing the positive charge. The positive charge accumulated on the surface of the dielectric layer 3 disturbs the growth of the corona discharge with positive polarity to the streamer corona discharge, and the streamer corona discharge is sequentially generated, since the positive charge is reduced by the electron charge each time the first electrode 1 develops a negative polarity.

In the first embodiment, when the pitch P of the serrated portion 1a of the first electrode 1 is set to 1 mm, the gap G between the serrated portion 1a and the second electrode 2 is set to 6 mm, the thickness T of the dielectric layer 3 is set to 1.5 mm, and the generated voltage V from the high voltage electric power source 4 is set in a range of about 5 to about 15 KV, it was confirmed that the streamer corona discharge is continuously generated in the space provided by the gap G.

Figure 4:
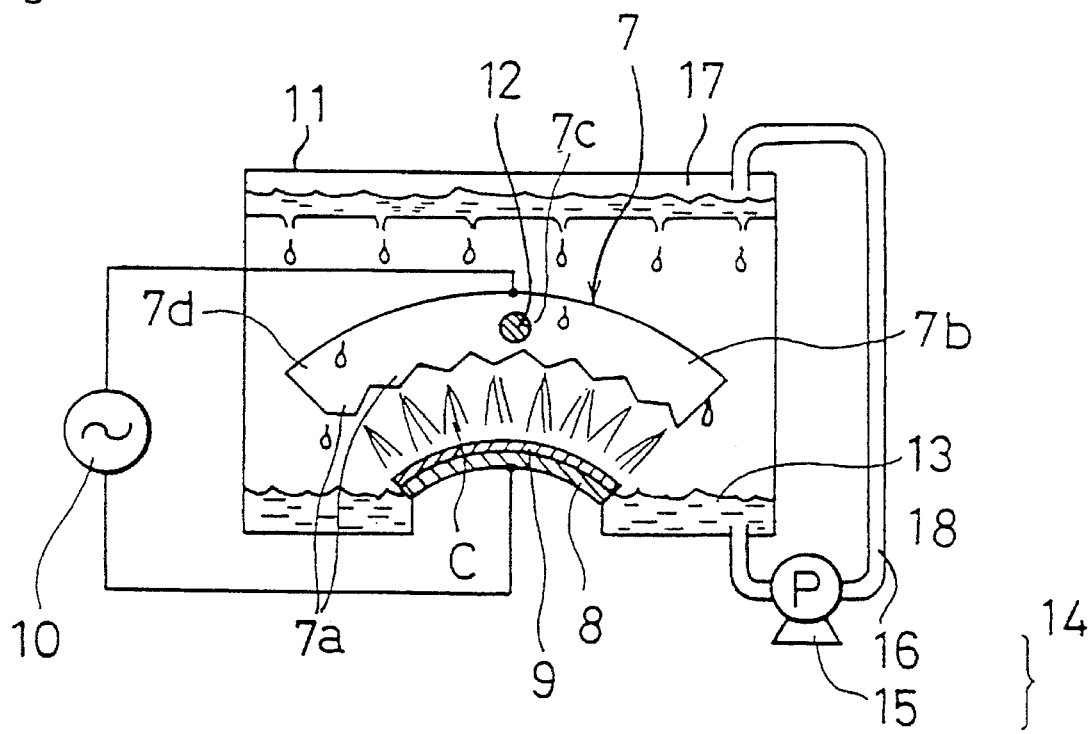
FIG. 4 is a schematic transverse sectional view of a second embodiment of the present invention.
Figure 5:
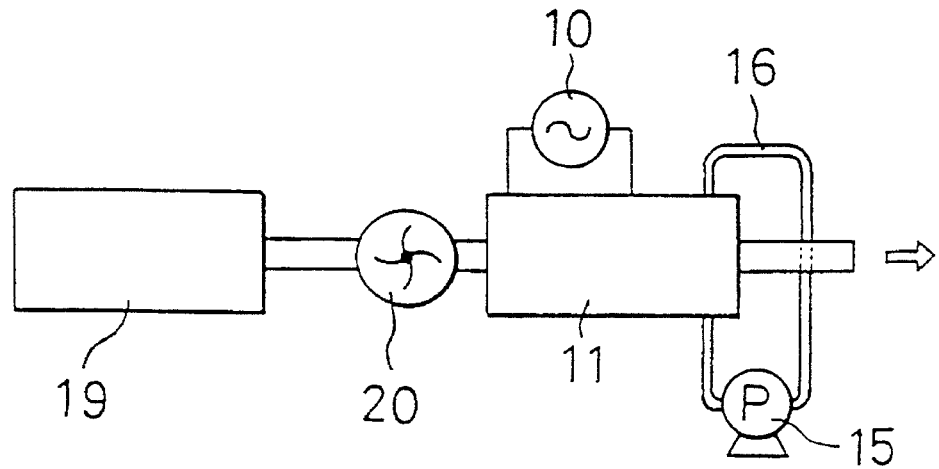
FIG. 5 is a block diagram for showing the state in which the embodiment as shown in FIG. 4 is connected to an impure gas generating source.

Referring now to FIGS. 4 and 5, a second embodiment of the present invention is shown, FIG. 4 shows a schematic sectional view of the gas purifying apparatus, and FIG. 5 is a block diagram showing an example in which the construction as shown in FIG. 4 is connected to an impure gas generating source.

In the figures, reference numeral 7 denotes a first electrode; reference numeral 8, a second electrode; reference numeral 9 to a dielectric layer; reference numeral 10 to a high voltage electric power source; reference numeral 11 to a reaction chamber of container; reference numeral 13 to a cleaning liquid; and reference numeral 14 to a cleaning liquid supplying portion. Each structure of these members will be explained hereinafter.

The first electrode 7 is composed of a plurality of conductive plates 7d each of which is made, for instance, of stainless steel formed with an arc-like shape by using a press-mold process. As shown in FIG. 4, the conductive plate 7d has a serrated portion 7a arranged in a circle formation at the periphery portion thereof and defines an opening 7c at the central potion thereof. The first electrode 7 is composed of such construction that a pole 12 made of glass or the like is inserted into the hole 7c of each conductive plate 7d, and the plane surface 7b of each conductive plate 7d is slanted with respect to the axial direction of the pole 12.

The second electrode 8 has an arc-like shape in cross-section, and is coated with a dielectric layer 9 at its surface. Since the second electrode 8 has an arc-like shape, it is possible to effectively drain the cleaning liquid 13 into a lower liquid tank 18.

The high voltage electric power source 10 has the same construction as that of the high voltage electric power source 4 of the first embodiment.

The reaction container 11 is similar to the container of the first embodiment, and features the first electrode 7 and an upper liquid tank 17 at the upper side thereof, and the second electrode 8 and the lower liquid tank 18 at the lower side. The lower liquid tank 18 is connected with the upper liquid tank 17 through the cleaning liquid supplying portion 14 composed of a pump 15 and pipe 16. By this construction, the cleaning liquid 13 in the lower tank 18 is circulated to the upper tank 17, and the cleaning liquid 13 precipitates down from the upper tank 17 to the first electrode 7 thereby cleaning the attachments attached at least on the first electrode 7. In the second embodiment, a liquid such as an engine oil with added suspensions is used as the cleaning liquid 13. However, the present invention is not limited to such liquid, for instance, a spray type cleaner may be alternatively utilized.

Similar to the first embodiment, in the reaction container 11, the streamer corona discharge C is generated between the serrated portion 7a of each first conductive plate 7d of the first electrode 7 and the second electrode 8 thereby forming a gas flow path in the atmosphere of the streamer corona discharge C. The serrated portion 7a of the first electrode 7 is disposed opposite to the second electrode 8 and is separated by a predetermined gap. The axis of the pole 12 for supporting the conductive plates 7d is disposed to conform with the gas flowing direction, and the plane surface 7d of the first electrode 7 is slanted relative to the gas flowing direction thereby reducing the flow resistance of the gas flow path.

The operation of the second embodiment is similar to that of the first embodiment except that attachments to at least the first electrode 7 are cleaned by the cleaning liquid supplying portion 14, and therefore an explanation of its operation can be omitted.

The impure gas introduced from an impure gas generating source 19 is cleaned by the reaction container 11 connected to the impure gas generating source 19. A blower 20 may be provided between the impure gas generating source 19 and the reaction container 11 as shown in FIG. 5.

From the foregoing description, one skilled in the art can easily ascertain the essential characteristics of this invention, and without departing from the spirit and scope thereof, can make various changes and modifications of the invention to adapt it to various usages and conditions. Therefore, the spirit and scope of the appended claims should not be limited to the description of the preferred versions contained herein.

What is claimed is:

1. A gas purifying apparatus comprising:

a container having an inlet and an outlet;

a plurality of first electrodes which are suspended on an essentially horizontal pole which extends in a direction which is essentially parallel with a path along which gases flow from said inlet to said outlet, said first electrodes each comprising a flat plate having a serrated lower edge, said first electrodes being located above the path and angled with respect to said pole in a manner effective to reduce a resistance to the flow of gases passing from said inlet to said outlet;

a second essentially horizontally extending electrode which is arranged to extend along below the path along which gases flow from said inlet to said outlet and so as to be opposite each serrated lower edge of said first electrodes;

a ceramic coating formed on a surface of said second electrode facing the serrated edges of said first electrodes; and a source of alternating current connected between said plurality of first electrodes and said second electrodes.

2. A gas purifying apparatus as set forth in claim 1, further comprising a source of cleaning fluid which includes an upper tank which is arranged above said plurality of first electrodes, said upper tank being arranged to permit gravity to carry cleaning fluid therefrom down over the first electrodes to remove matter which tends to accumulate thereon.

3. A gas purifying apparatus comprising:

a container having an inlet and an outlet;

a plurality of first electrodes which are suspended on an essentially horizontal pole which extends in a direction which is essentially parallel with a path along which gases flow from said inlet to said outlet, said first electrodes each comprising a flat plate having a serrated lower edge, said first electrodes being located above the path and angled with respect to said pole in a manner to reduce a resistance to the flow of gases passing from said inlet to said outlet;

a second essentially horizontally extending electrode which is arranged to extend along below the path along which gases flow from said inlet to said outlet and so as to be opposite each serrated lower edge of said first electrodes;

a ceramic coating formed on a surface of said second electrode facing the serrated edges of said first electrodes;

a source of alternating current connected between said plurality of first electrodes and said second electrodes;

a source of cleaning fluid which includes an upper tank which is arranged above said plurality of first electrodes, said upper tank being arranged to permit gravity to carry cleaning fluid therefrom down over the first electrodes to remove matter which tends to accumulate thereon; and a lower tank which is disposed below said second electrode for collecting the cleaning fluid which has passed over said first electrodes; and a pump for recirculating the cleaning fluid from said lower tank to said upper tank.

4. A gas purifying apparatus as set forth in claim 3, wherein said second electrode has an arcuate cross-section and is shaped to induce the cleaning fluid to drain therefrom into said lower tank.

* * * * *